United States Patent [19]

Kounkel et al.

[11] Patent Number: 4,479,381
[45] Date of Patent: Oct. 30, 1984

[54] TIRE DYNAMIC IMBALANCE SCREENING SYSTEM

[75] Inventors: Kenneth L. Kounkel, Silver Lake, Kans.; Loren K. Miller, Tallmadge; Kenneth A. Spriggel, Akron; Stephen L. Williams, Doylestown, all of Ohio

[73] Assignee: The Goodyear Tire & Rubber Company, Akron, Ohio

[21] Appl. No.: 544,837

[22] Filed: Oct. 24, 1983

Related U.S. Application Data

[63] Continuation of Ser. No. 188,707, Sep. 9, 1980, Pat. No. 4,414,843.

[51] Int. Cl.³ .................... G01M 1/00; G01M 17/02
[52] U.S. Cl. .......................................... 73/66; 73/146
[58] Field of Search ............................ 73/66, 462, 146

[56] References Cited

U.S. PATENT DOCUMENTS

| | | | |
|---|---|---|---|
| 3,303,571 | 2/1967 | Veals .................................. | 73/146 X |
| 4,023,407 | 5/1977 | Vanderzee ............................ | 73/146 |
| 4,258,567 | 3/1981 | Fisher .................................. | 73/146 |
| 4,311,044 | 1/1982 | Marshall et al. ..................... | 73/146 |

FOREIGN PATENT DOCUMENTS 197711 11/1977 U.S.S.R. ................................ 73/146

Primary Examiner—James J. Gill
Attorney, Agent, or Firm—Ronald E. Larson; T. P. Lewandowski

[57] ABSTRACT

The magnitude of a variable property of a tire such as the dynamic imbalance may be predicted by measuring lateral runout at positions close to the end of the thread pattern on both sides of the tire and determining the first harmonic runout values. The first harmonic runout values relative to the centerplane of the tire at different circumferential positions around the tire are arithmetically added. The largest sum at any point on the circumference of the tire gives an indication of the maximum dynamic imbalance of the tire. Tires can be screened by the system comparing this sum with predetermined amounts corresponding to the maximum acceptable dynamic imbalance or other standards and providing visual signals identifying those tires with the largest sum exceeding this predetermined amount or the other standards.

19 Claims, 6 Drawing Figures

TIRE DYNAMIC IMBALANCE SCREENING SYSTEM

This is a continuation of U.S. application Ser. No. 188,707, entitled "Tire Dynamic Imbalance Screening System", filed Sept. 9, 1980, in the names of Kounkel, et al., now U.S. Pat. No. 4,414,843.

This invention relates generally to a method and apparatus for predicting the magnitude of tire variables such as the ride property of tires and especially dynamic imbalance of tires. It is recognized that dynamic imbalance is detrimental to the wear and operation of a tire. Spin balancing equipment has been developed to determine the dynamic imbalance of tires and can be used in tire manufacturing plants or in automobile manufacturing plants to screen tires for dynamic imbalance. The spin balancing equipment, however, is relatively expensive and requires additional space. Also there is the additional labor cost in another tire handling operation involving the mounting, testing and dismounting of the tire on the spin balancing equipment.

The present invention is directed to a system for screening tires for dynamic imbalance without requiring the use of spin balancing equipment. Furthermore, the tires need not be rotated at a substantially high speed to obtain an indication of the dynamic imbalance. With the system of this invention, the necessary measuring apparatus can be incorporated into existing testing equipment such as a force variation machine and the testing operation can also be performed without a separate mounting and dismounting operation of the tire.

It has been found that where a tire is symmetrical about the centerplane of the tire the dynamic balance is not adversely affected even though there is appreciable runout at each side of the tire. However, when the tire is asymmetrical it has been observed that the tire is usually dynamically imbalanced. To determine the asymmetry by one method in accordance with this invention, the tire may be rotated at a relatively slow speed and the dynamic imbalance predicted by measuring the lateral runout at both sidewalls of the tire at positions close to the end of the tread pattern. The first harmonic runout values relative to the centerplane of the tire are then arithmetically added. The largest sum at any of the positions on the circumference of the tire has proven to reliably indicate the magnitude of dynamic imbalance of the tire. This information can be used in screening tires in a tire plant or in an assembly plant of an automobile manufacturer. Separate machines incorporating this system and apparatus may also be used in the field to check the magnitude of dynamic balance of new and used tires handled by dealers.

In accordance with one aspect of this invention there is provided a measuring apparatus for predicting the magnitude of tire variables in addition to lateral runout, such as the ride property of a tire comprising means to measure lateral runout on one side of the tire during rotation of the tire relative to the measuring means at a position between the area of maximum sectional width and the outer radial face of the tire, second means to measure lateral runout on the other side of the tire during rotation of the tire relative to the second measuring means at a second position having generally the same radius as the first-mentioned position, means to determine the first harmonic values for the runout at each circumferential position around the tire and means to determine the sum of the first harmonic values at corresponding circumferential locations around the tire to indicate the magnitude of the tire variables.

In accordance with another aspect of the invention there is provided a method for predicting a tire variable comprising the steps of providing rotation of a tire relative to a measuring means, measuring lateral runout on one side of a tire with the measuring means at a position between the area of maximum sectional width and the outer radial face of the tire, providing rotation of the tire relative to a second measuring means, measuring lateral runout on the other side of the tire with the second measuring means at a second position having generally the same radius as the first-mentioned position, determining the first harmonic values for the runout at each position, and adding the first harmonic values at corresponding circumferential positions around the tire to provide an indication of the magnitude of the tire variable.

To the accomplishment of the foregoing and related ends, the invention, then, comprises the features hereinafter fully described and particularly pointed out in the claims, the following description and the annexed drawings setting forth in detail certain illustrative embodiments of the invention, this being indicative, however, of but two of the various ways in which the principles of the invention may be employed.

Figure 1:
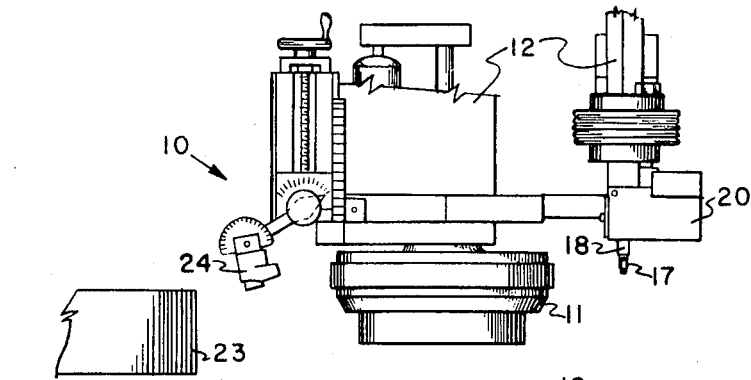
FIG. 1 is a partially schematic view of a tire force variation measuring and grinding machine adapted to provide the measurements required by the system of this invention, with parts being broken away.
Figure 2:
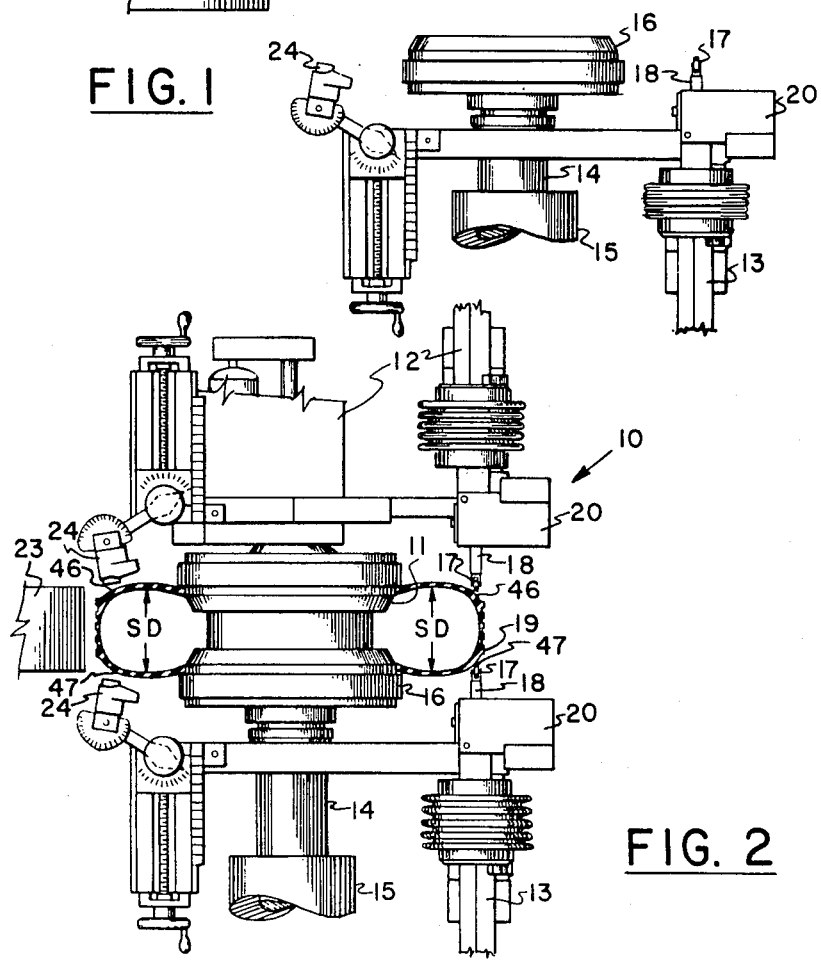
FIG. 2 is a view like FIG. 1 showing the tire mounted and inflated and the sensors in position for measuring lateral runout.

Referring to FIGS. 1 and 2, a tire testing machine such as force variation testing machine 10 is shown having an upper chuck 11 rotatably mounted on an upper frame 12. A lower frame 13 supports a vertical spindle 14 for rotation and vertical movement in a sleeve 15 attached to the frame. A lower chuck 16 is mounted on the spindle 14 and is axially movable from an open retracted position shown in FIG. 1 to a closed extended position shown in FIG. 2.

In accordance with this invention, lateral runout measuring means such as contact rollers 17 mounted on fingers 18 connected to linear displacement transducers are mounted on the upper frame 12 and lower frame 13 for engagement with a tire 19 mounted between the chucks 11 and 12 as shown in FIG. 2. The fingers 18 are carried by measuring mechanism supports 20 which are vertically adjustable relative to the upper frame 12 and lower frame 13 to provide clearance for movement of the tire 19 between the chuck 11 and lower chuck 16. The vertical adjustment may be provided by air-actuated piston and cylinder apparatus mounted on the frames 12 and 13 and carrying the measuring mechanism supports 20 from retracted positions, shown in FIG. 1, to extend positions, shown in FIG. 2, with the rollers 17 in contact with the tire 19.

Tire inflation means such as a port (not shown) in one of the chucks 11 or 16 is also provided for communication between the space enclosed by the tire 19 and a source of air pressure. A load roll 23 is movable radially of the tire 19 into engagement with the tread of the tire and may be used to seat the tire on the bead seats of the upper chuck 11 and lower chuck 16.

As an alternative to the roller 17 in contact with the tire 19 proximity sensors 24 may be carried on the measuring mechanism supports 20 for vertical adjustment into positions spaced from the tire. The sensors 24 provide signals indicating lateral runout as the tire 19 is rotated on the chucks 11 and 16.

Figure 4:
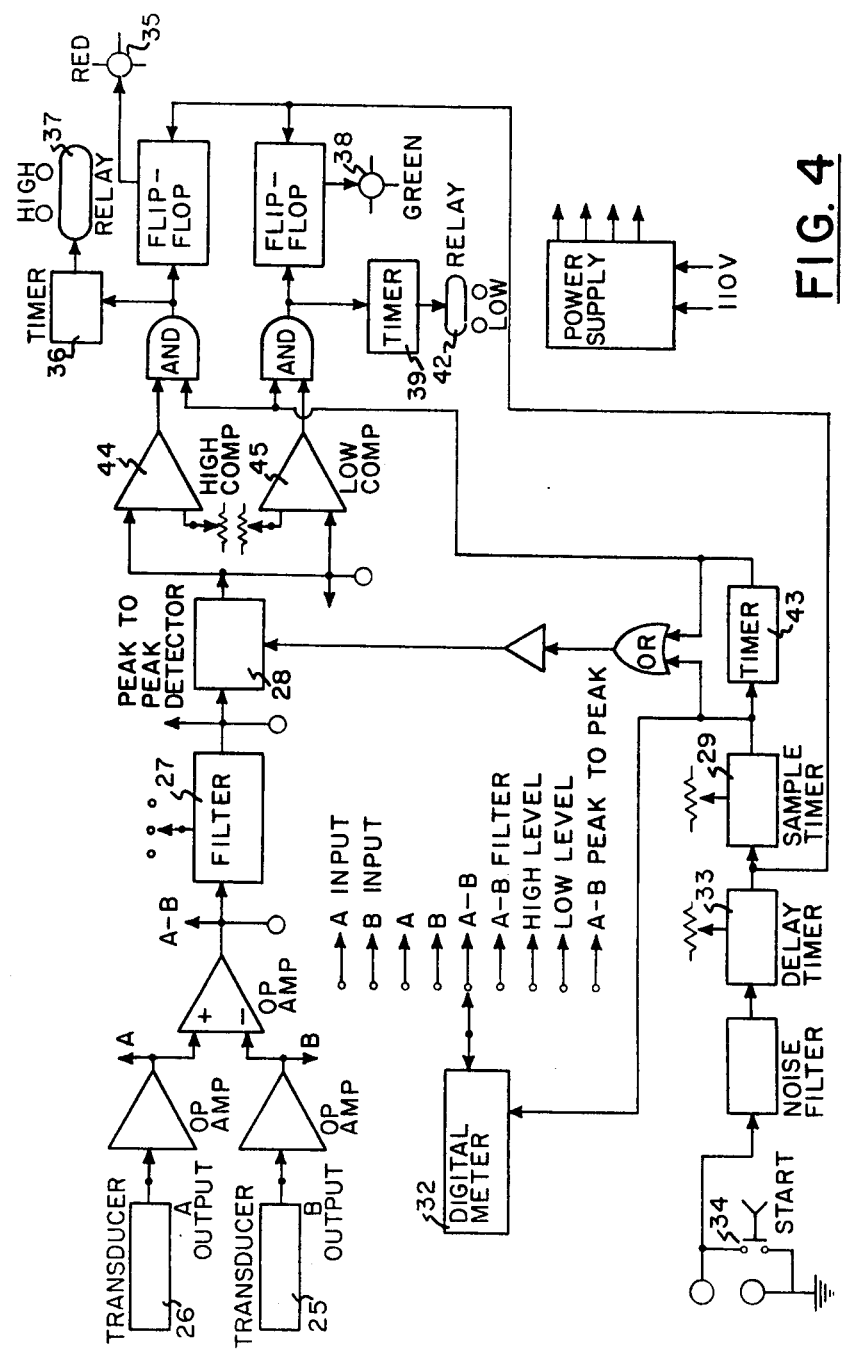
FIG. 4 is a block diagram illustrating the elements of an embodiment shown.

Referring to FIG. 4, a block diagram is shown illustrating another embodiment of the invention. A first linear transducer 25 is connected to one of the measuring mechanisms actuated by one of the rollers 17 or sensors 24 on one side of the tire 19. A second identical linear transducer 26 is connected to the other of the measuring mechanisms actuated by the other of the rollers 17 or sensors 24.

The output voltages from the transducers 25 and 26 can be scaled up or down and in this embodiment are reduced by one-half. The output voltage B from the linear displacement transducer 25 is subtracted from the output voltage A of the linear displacement transducer 26. This signal which has an amplitude at any point of A-B is transmitted through a filter such as four-pole low pass filter 27 which eliminates second harmonic and higher frequencies. The filtered A-B signal is transmitted to a peak-to-peak detector 28 which produces an output voltage A-B,P/P corresponding to the maximum peak-to-peak value of the first harmonic (i.e., fundamental) component of the A-B filtered signal. A sample timer 29 is connected to the peak-to-peak detector 28 and controls the interval of time from one-half to sixteen seconds in which the detector measures the incoming signal or the "sample time" shown by the interval T2-T3 in the timing diagram of FIG. 3. This peak-to-peak value is displayed on a digital meter 32 and simultaneously compared to manually selected high and low limits.

A delay timer 33 is provided to control the pretesting time of from one-half to sixteen seconds for one and one-half revolutions of the tire 19 so that data may be taken and the lamp circuits reset. This is indicated on the timing diagram of FIG. 3 by interval T1-T2 after the system has been started by actuating switch 34 at T1 and before the "sample time" indicated by interval from T2-T3 in FIG. 3.

Visual indications are provided of high and low levels of the peak-to-peak A-B voltage. Red light 35 is lighted when the A-B peak-to-peak voltage is equal to or higher than a predetermined high limit which may correspond to an upper limit of acceptable dynamic imbalance. When this happens, a timer 36 may be actuated and a high relay 37 closes the contacts for from four to fifteen seconds. This interval T4-T5 is illustrated in FIG. 3.

In a similar manner, a green light 38 is lighted when the A-B peak-to-peak voltage is equal to or less than a predetermined limit which may correspond to a particularly low value of dynamic imbalance. When this happens a timer 39 may be actuated and a low relay 42 closes the contacts for an interval T4-T5 from four to fifteen seconds.

When the A-B,P/P voltage is between the high and low limits neither the red light 35 or the green light 38 will be lighted indicating another degree of dynamic imbalance. Referring to the timing diagram of FIG. 3, the timing interval between T3 and T4 is provided by timer 43 which is set approximately one second during which time the outputs in high comparator 44 or low comparator 45 are transferred to the circuits for the green light 38 and relay 42 or the red light 35 and relay 37.

Figure 3:
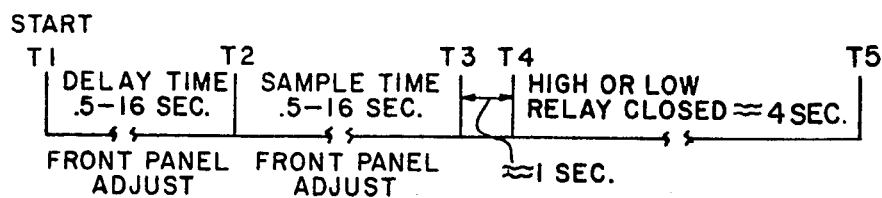
FIG. 3 is a timing diagram illustrating the sequence of operation after the tire is mounted and inflated.

It is important that during the sample interval T2-T3 on the timing chart in FIG. 3 the peak-to-peak detector holds the highest peak-to-peak values which occur during at least one revolution of the tire. Preferably the sample timer 29 is set for one and one-half revolutions of the tire 19.

Figure 5:
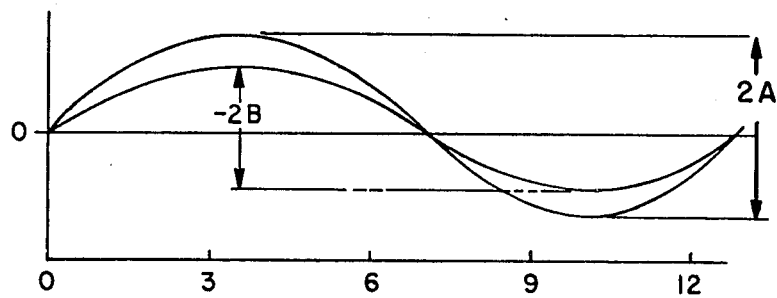
FIG. 5 is a graph showing the positive and negative first harmonic values of the runout measurements on opposite sides of the tire at corresponding positions circumferentially around the tire.
Figure 6:
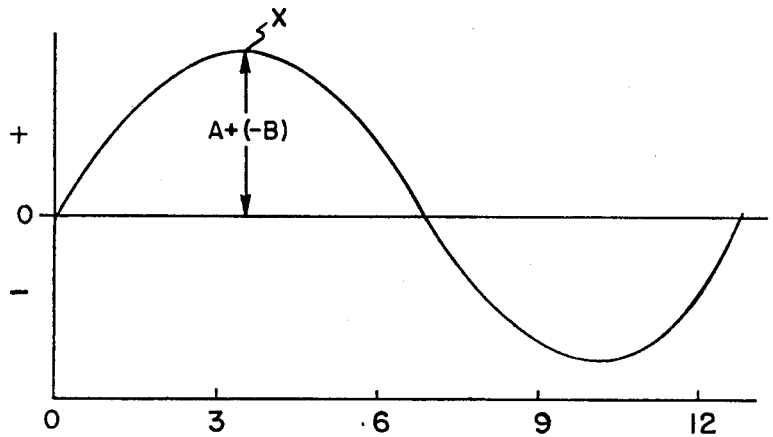
FIG. 6 is a graph like FIG. 5 but with a different scale ordinate showing the arithemetic sum of the first harmonic values shown in FIG. 5.

Referring to the graph of FIG. 5, which illustrates the values determined by the first-mentioned embodiment the first harmonic A and (−B) peak-to-peak values are shown on the ordinate of the graph and their relation to neutral planes at each side of the tire 19 perpendicular to an axis of the tire, indicated by line 0—0. These values are shown at positions around the circumference of the tire 19 indicated by points 0 through 12 on the abscissa of the graph. The B values are shown in the negative and phase adjusted so that the peak-to-peak A and (−B) values (2A and (−2B) shown in FIG. 5) can be measured at an indicated position on the circumference. As shown in FIG. 6, the sum A+(−B) can then be determined at these positions and when properly analyzed is an indication of the magnitude of dynamic imbalance of the tire 19.

For example, referring to FIG. 2, when the upper roller 17 is extended due to lateral runout, this produces a voltage A from a linear displacement transducer. Likewise when the lower roller 17 is retracted due to lateral runout, this produces a voltage (−B) from another linear displacement transducer. When these voltages are filtered to obtain the first harmonic values A and B and value A subtracted from value B, the result is equal to the sum of A+(−B) as shown in FIG. 6, and the maximum A+(−B) valve is indicated by letter X on the graph. The maximum A+(−B) value X determined by the peak-to-peak detector is an indicator of the magnitude of dynamic imbalance of the tire 19.

As shown in FIG. 2, the lateral runout is measured at positions 46 and 47 close to the end of the tread pattern on both sides of the tire between the area of maximum sectional width SD and the outer radial face of the tire. Preferably the rollers 17 engage the tire 19 at a surface of the tire which is smooth. This is not necessary where the sensors 24 are used since there is no rolling contact with the tire.

In operation, the force variation testing and grinding machine 10 is positioned for receiving the tire 19 by retracting the lower chuck 16. The measuring mechanism supports 20 are also retracted to provide space for the tire 19 to be inserted and supported on the lower chuck 16. The lower chuck 16 is then raised on the spindle 14 and the beads of the tire 19 seated on the bead seats of the chucks 11 and 16 as shown in FIG. 2. The tire 19 is preferably inflated to an operating pressure. If desired, the load roll 23 may be moved radially inward into engagement with the tread surface of the tire 19 to assist in seating the beads on the chucks 11 and 16.

The measuring mechanism supports 20 are then moved into position for measuring the lateral runout either by the rollers 17 and fingers 18 or by the proximity sensors 24. This is done while the tire 19 is rotated in the horizontal position, as shown in FIG. 2, with the upper chuck 11 being driven by power means at a predetermined speed of rotation and the lower chuck 16 being rotated by the upper chuck on the spindle 14.

As shown in FIG. 4, the screening is provided by adjusting the high level comparator 44 to a desired value so that when data is being taken the maximum value of the A-B,P/P signal will be compared to this level. If the signal is equal to or above this limit, the red light 35 will come on. The low comparator 45 is adjusted for a desired low limit so that when the unit is taking data the maximum A-B,P/P signal will be compared to this level. If it is equal to or below this limit, the green light 38 will come on.

After starting the screening system with the tire 19 rotating with the chucks 11 and 16, as shown in FIG. 2, by actuating the switch 34, the tire is rotated for a predetermined interval T1-T2 which is long enough to allow the circuit to settle down after the transducers 25 and 26 have been brought into position with the roller 17 or sensors 24 for signaling the lateral runout. Preferably this time provides for approximately one and one-half revolutions of the tire 19. After this, the data is taken during the sample time T2-T3 which is set for as long as possible but at least one and one-half revolutions of the tire 19. The maximum A-B,P/P value which occurs during the sample period is held on the digital meter 32 and the visual indication of the high and low levels is provided by the red light 35 or green light 38. After the sample time T2-T3, the high relay 37 or low relay 42 will be closed for a predetermined time while the red light 35 or green light 38 is on.

In a tire manufacturing plant or an automobile assembly plant, the usual process after the above screening is done includes retracting the measuring mechanism support 20 while the tire 19 is still inflated and then moving the load roll 23 into engagement with the tire for testing the force variations in the tire. After this test, the tire 19 may be deflated and removed.

While certain representative embodiments and details have been shown for the purpose of illustrating the invention, it will be apparent to those skilled in the art that various changes and modifications may be made therein without departing from the invention.

We claim:

1. Apparatus for predicting the ride property of a tire comprising:
    sensing means for sensing the lateral asymmetry of the tire; and
    comparing means for comparing the lateral asymmetry to a predetermined value whereby the ride property of the tire is indicated.

2. Apparatus, as claimed in claim 1, wherein the sensing means further comprises means for determining the lateral runout of the tire at predetermined intervals around the circumference of the tire.

3. Apparatus, as claimed in claim 2, wherein the means for determining comprises means for determining the lateral runout at both sides of the tire.

4. Apparatus, as claimed in claim 3, and further comprising means for enabling relative movement between the means for determining lateral runout and the tire.

5. Apparatus, as claimed in claim 3, wherein the means for determining comprises a first transducer located on a first side of the tire and a second transducer located on the second side of the tire and wherein the first and second transducers are equidistant from the rotational axis of the tire.

6. Apparatus, as claimed in claim 3, and further including means for inflating said tire so that said sensing means may be in engagement with the tire in the inflated condition.

7. Apparatus, as claimed in claim 3, and further including upper and lower chuck means for supporting said tire in a position for rotation about a vertical axis, said lower chuck means being retractable for receiving said tire and movable axially into engagement with said chuck means for mounting said tire.

8. Apparatus, as claimed in claim 7, wherein said sensing means is at least partially retractable for providing clearance so that said tire may be mounted on said lower chuck means without damaging the sensing means.

9. Apparatus, as claimed in claim 3, wherein the sensing means further comprises difference means for generating the difference between the lateral runout at both sides of the tire.

10. Apparatus, as claimed in claim 9, wherein the comparing means comprises:
    means for generating the first harmonic of said difference;
    means for generating the maximum value of the first harmonic; and
    means for comparing the maximum value to a predetermined value.

11. Apparatus, as claimed in claim 10, and further comprising means for altering the predetermined value.

12. A method of predicting the ride property of a tire comprising the steps of:
    sensing the lateral asymmetry of the tire; and
    comparing the lateral asymmetry to a predetermined value whereby the ride property of the tire is indicated.

13. A method, as claimed in claim 12, wherein the step of sensing comprises the step of determining the lateral runout of the tire at a plurality of intervals around the circumference of the tire.

14. A method, as claimed in claim 13, wherein the step of determining comprises the step of determining the lateral runout at both sides of the tire.

15. A method, as claimed in claim 14, wherein the step of determining comprises the lateral at both sides of the tire in locations equidistant from the rotational axis of the tire.

16. A method, as claimed in claim 15, and further comprising the step of inflating said tire so that the lateral runout is determined with the tire in the inflated condition.

17. A method, as claimed in claim 14, wherein the step of sensing comprises the step of generating the difference between the lateral runout at both sides of the tire.

18. A method, as claimed in claim 17, wherein the step of comparing comprises:
    generating the first harmonic of said difference;
    generating the maximum value of the first harmonic; and
    comparing the maximum value to a predetermined value.

19. A method, as claimed in claim 18, and further comprising the step of altering the predetermined value.

* * * * *